United States Patent
Delvat et al.

(10) Patent No.: US 7,587,666 B2
(45) Date of Patent: Sep. 8, 2009

(54) METHODS, COMPUTER PROGRAM PRODUCTS AND DATA PROCESSING SYSTEMS FOR DISPLAYING A PLURALITY OF DATA OBJECTS

(75) Inventors: Julien Delvat, Antibes (FR); Roman Rapp, Antibes (FR); Bernd Junginger, Bangalore (IN)

(73) Assignee: SAP AG, Walldorf (DE)

( * ) Notice: Subject to any disclaimer, the term of this patent is extended or adjusted under 35 U.S.C. 154(b) by 486 days.

(21) Appl. No.: 11/080,816

(22) Filed: Mar. 16, 2005

(65) Prior Publication Data
US 2005/0216504 A1 Sep. 29, 2005

(30) Foreign Application Priority Data
Mar. 16, 2004 (EP) ................. 04006188

(51) Int. Cl.
*G06F 17/24* (2006.01)
(52) U.S. Cl. .............. 715/227; 715/200; 715/212; 715/213
(58) Field of Classification Search ........... 715/500, 715/503, 509, 792, 904, 200, 212, 213, 227; 707/104.1
See application file for complete search history.

(56) References Cited

U.S. PATENT DOCUMENTS

| | | | |
|---|---|---|---|
| 5,317,306 A | | 5/1994 | Abraham et al. |
| 5,317,686 A | * | 5/1994 | Salas et al. ................. 715/503 |
| 5,621,876 A | | 4/1997 | Odam et al. |
| 6,151,059 A | * | 11/2000 | Schein et al. ................. 725/37 |
| 6,225,996 B1 | | 5/2001 | Gibb et al. |
| 6,298,342 B1 | | 10/2001 | Alger et al. |
| 6,313,848 B1 | * | 11/2001 | Hoag ........................ 345/684 |
| 6,604,095 B1 | * | 8/2003 | Cesare et al. .................. 707/1 |
| 6,626,959 B1 | * | 9/2003 | Moise et al. ................ 715/522 |
| 6,779,152 B1 | * | 8/2004 | Conner et al. .............. 715/509 |
| 7,225,200 B2 | * | 5/2007 | Chickering et al. ......... 707/102 |
| 7,237,188 B1 | * | 6/2007 | Leung ........................ 715/509 |
| 2002/0198906 A1 | | 12/2002 | Press |

FOREIGN PATENT DOCUMENTS

WO    WO 02/25500 A    3/2002

OTHER PUBLICATIONS

EPO Search Report, dated Sep. 29, 2004 (3 pages).

* cited by examiner

*Primary Examiner*—Joshua D Campbell
(74) *Attorney, Agent, or Firm*—SAP/Finnegan, Henderson LLP

(57) ABSTRACT

Embodiments consistent with the present invention relate to methods and systems for displaying a plurality of data objects, each of the data objects including an object type of a predefined set of object types, each object type including a set of attributes. In one implementation, a method is provided that comprises displaying a first table including a row for each data object of the plurality of data objects and a column for each attribute of the sets of attributes, selecting one of the data objects by selecting one of the rows in the first table, and displaying a second table including a row for each attribute of the selected data object, wherein the first and second tables are displayed in respective first and second display areas.

19 Claims, 9 Drawing Sheets

| Name | A | B | C | D | E | F | G | H | I | Name | Value |
|---|---|---|---|---|---|---|---|---|---|---|---|
| (I) 1 | 1 | 2 | 3 | 4 | 5 | 6 | | | | A | 1 |
| (I) 2 | 2 | 3 | 4 | 5 | 6 | 7 | | | | B | 2 |
| (I) 3 | 3 | 4 | 5 | 6 | 7 | 8 | | | | C | 3 |
| (I) 4 | 4 | 5 | 6 | 7 | 8 | 9 | | | | D | 4 |
| (I) 5 | 5 | 6 | 7 | 8 | 9 | 10 | | | | E | 5 |
| (II) 1 | 1 | 2 | | 4 | 5 | | 3 | 6 | 7 | F | 6 |
| (II) 2 | 2 | 3 | | 5 | 6 | | 4 | 7 | 8 | | |
| (II) 3 | 3 | 4 | | 6 | 7 | | 5 | 8 | 9 | | |
| (II) 4 | 4 | 5 | | 7 | 8 | | 6 | 9 | 10 | | |

| Name | A | B | C |
|---|---|---|---|
| (I) 1 | 1 | 2 | 3 |
| (I) 2 | 2 | 3 | 4 |
| (I) 3 | 3 | 4 | 5 |
| (I) 4 | 4 | 5 | 6 |
| (I) 5 | 5 | 6 | 7 |

Figures 4, 5:
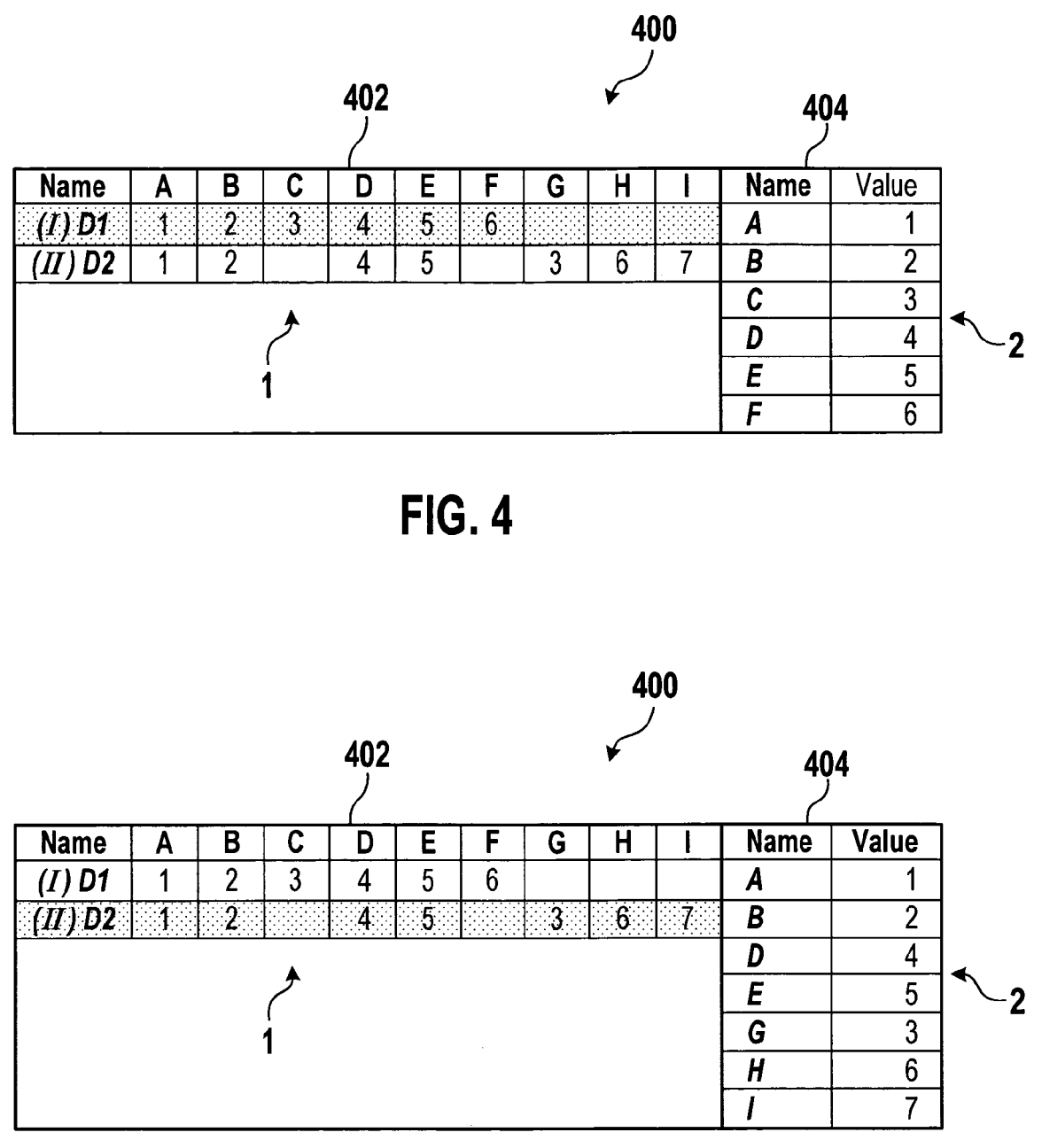

400

402

| Name | A | B | C | D | E | F | G | H | I |
|------|---|---|---|---|---|---|---|---|---|
| (I) D1 | 1 | 2 | 3 | 4 | 5 | 6 | | | |
| (II) D2 | 1 | 2 | | 4 | 5 | | 3 | 6 | 7 |
| | | | | | | | | | |

1

404

| Name | Value |
|------|-------|
| A | 1 |
| B | 2 |
| C | 3 |
| D | 4 |
| E | 5 |
| F | 6 |

| Name | A | B | C | D | E | F | G | H | I |
|------|---|---|---|---|---|---|---|---|---|
| (I) D1 | 1 | 2 | 3 | 4 | 5 | 6 | | | |
| (II) D2 | 1 | 2 | | 4 | 5 | | 3 | 6 | 7 |
| | | | | | | | | | |

1

404

| Name | Value |
|------|-------|
| A | 1 |
| B | 2 |
| D | 4 |
| E | 5 |
| G | 3 |
| H | 6 |
| I | 7 |

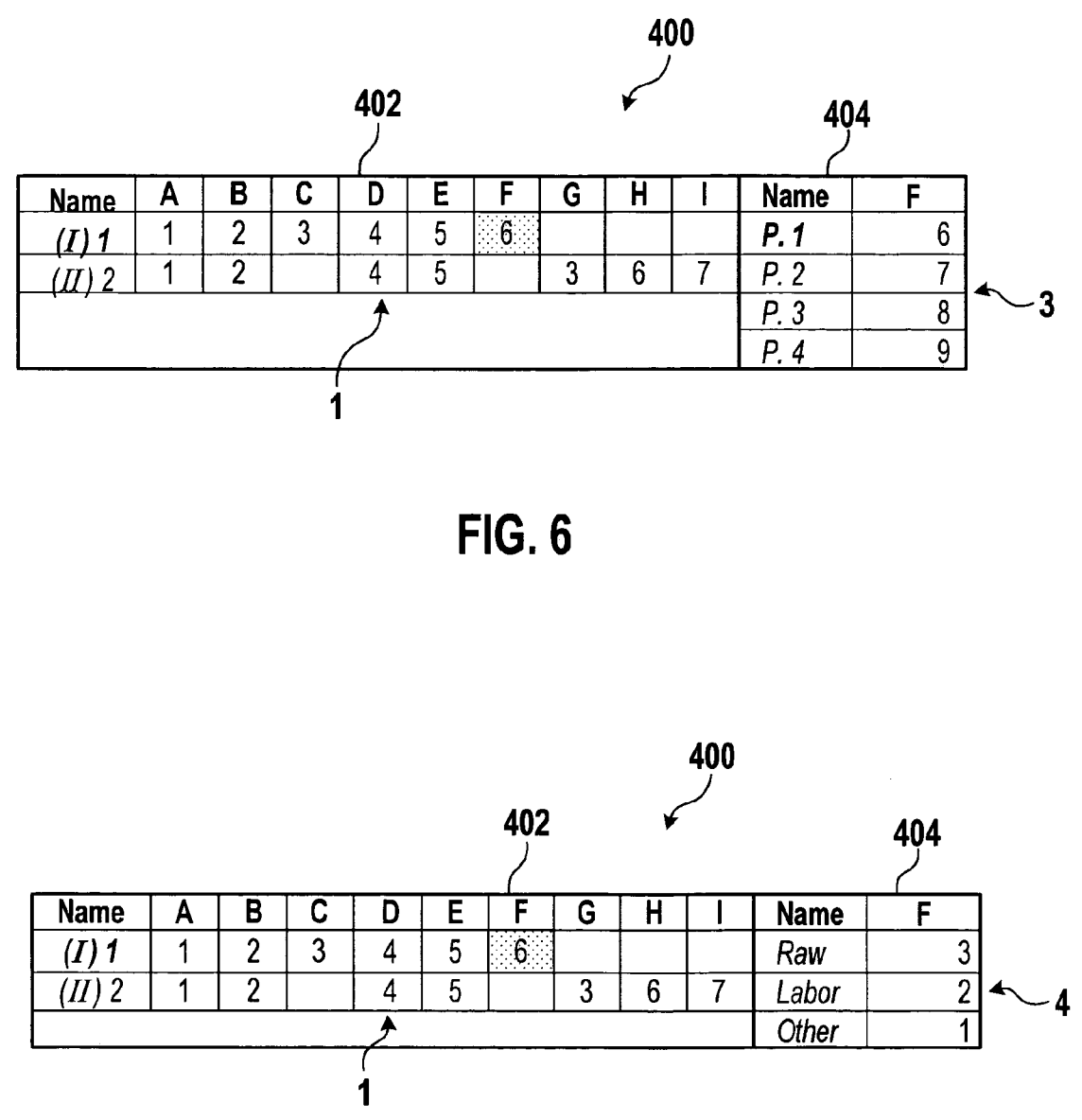

| Name | A | B | C | D | E | F | G | H | I | Name | F |
|---|---|---|---|---|---|---|---|---|---|---|---|
| (I) 1 | 1 | 2 | 3 | 4 | 5 | 6 | | | | P. 1 | 6 |
| (II) 2 | 1 | 2 | | 4 | 5 | | 3 | 6 | 7 | P. 2 | 7 |
| | | | | | | | | | | P. 3 | 8 |
| | | | | | | | | | | P. 4 | 9 |

FIG. 7

| Name | A | B | C | D | E | F | G | H | I | Name | F |
|---|---|---|---|---|---|---|---|---|---|---|---|
| (I) 1 | 1 | 2 | 3 | 4 | 5 | 6 | | | | Raw | 3 |
| (II) 2 | 1 | 2 | | 4 | 5 | | 3 | 6 | 7 | Labor | 2 |
| | | | | | | | | | | Other | 1 |

FIG. 8

| Name | A | B | C | D | E | F | G | H | I | Name | Value |
|---|---|---|---|---|---|---|---|---|---|---|---|
| (I) 1 | 1 | 2 | 3 | 4 | 5 | 6 | | | | A | 1 |
| (I) 2 | 2 | 3 | 4 | 5 | 6 | 7 | | | | B | 2 |
| (I) 3 | 3 | 4 | 5 | 6 | 7 | 8 | | | | C | 3 |
| (I) 4 | 4 | 5 | 6 | 7 | 8 | 9 | | | | D | 4 |
| (I) 5 | 5 | 6 | 7 | 8 | 9 | 10 | | | | E | 5 |
| (II) 1 | 1 | 2 | | 4 | 5 | | 3 | 6 | 7 | F | 6 |
| (II) 2 | 2 | 3 | | 5 | 6 | | 4 | 7 | 8 | | |
| (II) 3 | 3 | 4 | | 6 | 7 | | 5 | 8 | 9 | | |
| (II) 4 | 4 | 5 | | 7 | 8 | | 6 | 9 | 10 | | |

| Name | A | B | C |
|---|---|---|---|
| (I) 1 | 1 | 2 | 3 |
| (I) 2 | 2 | 3 | 4 |
| (I) 3 | 3 | 4 | 5 |
| (I) 4 | 4 | 5 | 6 |
| (I) 5 | 5 | 6 | 7 |

FIG. 9

| Name | A | B | C | D | E | F | G | H | I | Name | Value |
|---|---|---|---|---|---|---|---|---|---|---|---|
| (I) 1 | 1 | 2 | 3 | 4 | 5 | 6 | | | | A | 1 |
| (I) 2 | 2 | 3 | 4 | 5 | 6 | 7 | | | | B | 2 |
| (I) 3 | 3 | 4 | 5 | 6 | 7 | 8 | | | | C | 3 |
| (I) 4 | 4 | 5 | 6 | 7 | 8 | 9 | | | | | |
| (I) 5 | 5 | 6 | 7 | 8 | 9 | 10 | | | | | |
| (II) 1 | 1 | 2 | | 4 | 5 | | 3 | 6 | 7 | | |
| (II) 2 | 2 | 3 | | 5 | 6 | | 4 | 7 | 8 | | |
| (II) 3 | 3 | 4 | | 6 | 7 | | 5 | 8 | 9 | | |
| (II) 4 | 4 | 5 | | 7 | 8 | | 6 | 9 | 10 | | |

| Name | A | B | C |
|---|---|---|---|
| (I) 1 | 1 | 2 | 3 |
| (I) 2 | 2 | 3 | 4 |
| (I) 3 | 3 | 4 | 5 |
| (I) 4 | 4 | 5 | 6 |
| (I) 5 | 5 | 6 | 7 |

METHODS, COMPUTER PROGRAM PRODUCTS AND DATA PROCESSING SYSTEMS FOR DISPLAYING A PLURALITY OF DATA OBJECTS

TECHNICAL FIELD

The present invention generally relates to methods and systems for displaying information using, for example, computers. More particularly, embodiments of the invention relate to the presentation of information contained in electronic spreadsheets and databases in tabular form.

BACKGROUND INFORMATION

Spreadsheet and database applications allow users to view and manipulate tabular data, i.e., information organized into rows and columns. Often, the tabular data is too large to fit on the display screen. Existing applications address this problem by providing users with the ability to scroll information both vertically and horizontally. In a windowing desktop environment, such as SAP R/3, Microsoft Windows and the like, the problem of fitting information on the screen is exacerbated, because a plurality of windows can appear on the screen simultaneously, and each window may be significantly smaller than the display screen. Furthermore, users of most windowing desktop environments may interactively or dynamically change the size of a window at any time, which may reduce the available space for displaying tabular data.

Several existing systems attempt to overcome the problem of using tables that are wider than the window space available to display them. For example, U.S. Pat. No. 5,317,306 allows the user to determine which columns are most important to him or her, and to designate those columns as "sticky." When a table contains more columns of information than can be displayed simultaneously, the user must scroll horizontally to view an entire row. The "sticky" columns remain in the display window when the user enters a command for horizontal scrolling.

A similar method is used in Microsoft Corporation's Excel spreadsheet application, in which a user may select a row, column, or cell, and choose to "freeze panes," which splits the window, thereby causing all rows and columns above and to the left of the selected position to remain frozen in place while the rest of the display remains responsive to scrolling commands. A user also may make additional room in the window by designating a row or column as hidden, which suppresses its display until said row or column is unhidden by a user command. Alternatively, all columns can be displayed in one window, but this often results in a character size that is not readable Still another method is disclosed in U.S. Pat. No. 5,621, 876, which describes a method for increasing the number of columns in the display by adding an additional column when the user selects an "increase activator" button. This method makes the window larger, if the additional column will fit on the display screen. Otherwise, it makes the other columns narrower to accommodate the additional column.

Further, U.S. Pat. No. 6,313,848 shows a method of viewing wide tables with reduced need for horizontal scrolling. The method includes the steps of determining the width of each column, determining the height of each row, and determining the dynamic height and width of the workspace available for the display of tabular data within the window and dividing the tabular data into table segments, each table segment comprising one or more columns of the tabular data.

Embodiments consistent with the present invention aim to provide improved methods, computer program products and data processing systems for displaying a plurality of data objects.

SUMMARY

According to an embodiment consistent with the present invention, there is provided a method for displaying a plurality of data objects. Each of the data objects can have an object type of a predefined set of object types and each object type can have a set of attributes. The plurality of data objects are displayed by means of a first table having a row for each data object of the plurality of data objects and a column for each attribute of the set of attributes. The user can select one of the data objects shown in the first table by selecting the corresponding row of the first table. In response, a second table is displayed that has a row for each attribute of the selected data object. The first and second tables can be displayed on respective first and second display areas.

The above-described embodiment is advantageous as it can enable a user to view a selected complete data object even if the first table is too large to fit on the display screen.

In accordance with another embodiment, the first table and the second table can be displayed on respective first and second panes of a common window. Alternatively, the first and second tables can be displayed in first and second windows, respectively, that can be manipulated by the user independently from each other.

In accordance with a further embodiment of the invention, a sequential display mode is provided. In the sequential display mode, the user selects one of the attributes of a selected row from the first table. In response, a third table is generated that has a row for each time period of the selected attribute.

In accordance with a further embodiment of the invention, an analytical display mode is provided. In the analytical display mode, a user can select one of the attributes of the selected row of the first table. In response, a fourth table is generated and displayed in the second display area. The fourth table may have a row for each data component that contributes to the selected attribute.

In accordance with another embodiment of the invention, each set of attributes has first and second attributes. The first attributes have a first change frequency that is below a second change frequency of the second attributes. For example, the first attributes are characteristic attributes, e.g., master data attributes, that usually do not change and define the object, and the second attributes are key figure attributes, such as dynamic data values that change frequently within given time periods.

A third display area can be provided for displaying a fifth table. The fifth table can serve for displaying of selected object types of the predefined set of object types. Only the first attributes that are defining attributes for the object types are displayed in the fifth table as the second attributes have no data values in the object type definitions. The fifth table can have a row for each selected object type and a column for each first attribute of the selected object types. A user can select one of the rows of the fifth table for selection of the object type being displayed in that row. In response, a sixth table is generated and displayed in the second display area. The sixth table has a row for each first attribute of the selected object type.

In accordance with yet a further embodiment of the invention, the user can create a data object by instantiating a selected object type displayed in the third display area. The newly created data object can be added to the first table by performing a drag and drop operation.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles consistent with the present invention. In the drawings:

FIG. 4 shows a schematic example of first and second display areas with respective tables;

FIG. 5 shows the example of FIG. 4 whereby another row in the first table is selected;

FIG. 6 shows an example of a sequential display mode;

FIG. 7 shows an example for an analytical display mode;

FIG. 8 shows an example of an object type view;

FIG. 9 shows an example for a sixth table being generated in response to selection of one of the object types in the object type view of FIG. 8;

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
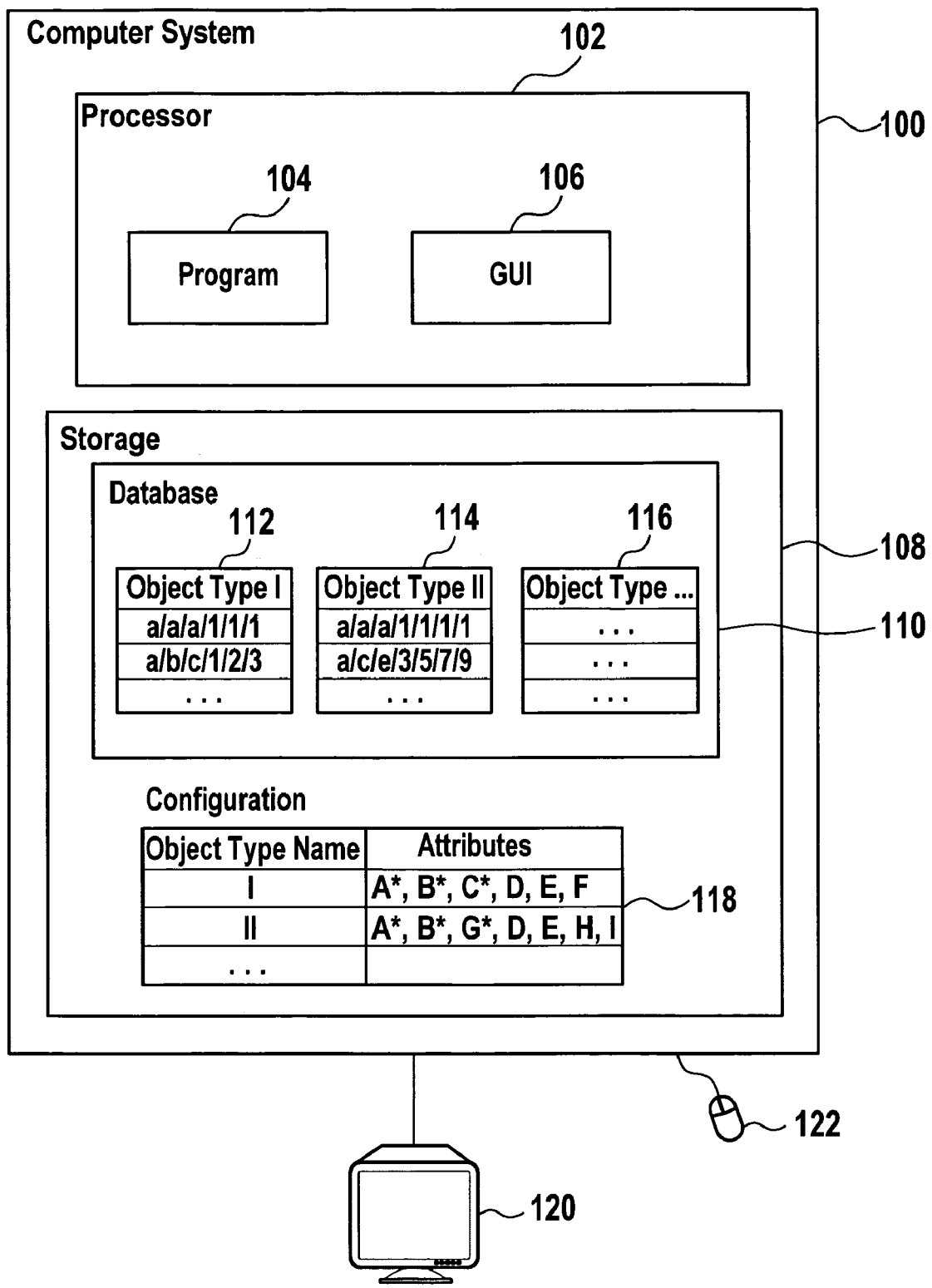
FIG. 1 is a block diagram of an exemplary computer system environment, consistent with an embodiment of the present invention.

FIG. 1 shows an exemplary computer system 100, consistent with an embodiment of the invention. Computer system 100 includes a processor 102 for executing a computer program 104 and a graphical user interface program 106. Storage 108 of computer system 100 contains a database 110 for storing database tables 112, 114, 116, . . . By way of example, database table 112 serves for storage of instances of object type I. Further, database table 114 may serve for storage of instances of object type II, and additional database tables (116, etc.) may be provided for the storage of instances of other object types.

As shown in FIG. 1, a configuration table 118 is also stored in storage 108. Configuration table 118 contains object type definitions. Each object type definition includes an object type name, the characteristic attributes of the object type and key figure attributes of the object type. Characteristic attributes of an object type are attributes that define the object type, such as master data. Characteristic attributes are typically invariant or change infrequently. In contrast, key figure attributes are usually dynamic data values that change frequently over given periods of time.

In the embodiment considered here, object types I and II are defined in configuration table 118 (see FIG. 1). Object type I has characteristic attributes A*, B*, C* and key figure attributes D, E, F. Object type II has characteristic attributes A*, B*, G* and key figure attributes, D, E, H and I.

It is to be noted that in some implementations there will be a large number of object types having large numbers of characteristic and key figure attributes stored in configuration table 118. For ease of explanation, only object types I and II are shown in FIG. 1. Further, it is to be noted that instead of database 110, an XML file can be used for storage of the configuration information contained in configuration table 118.

As further shown in FIG. 1, a computer monitor 120 and computer mouse 122 are coupled to computer system 100. Graphical user interface program 106 may generate one or more displays for computer monitor 120. Further, by means of computer mouse 122, a user can interact with graphical user interface program 106.

Operation of computer system 100 will be explained in greater detail in the following by making reference to, for example, FIGS. 2 and 3.

Figure 2:
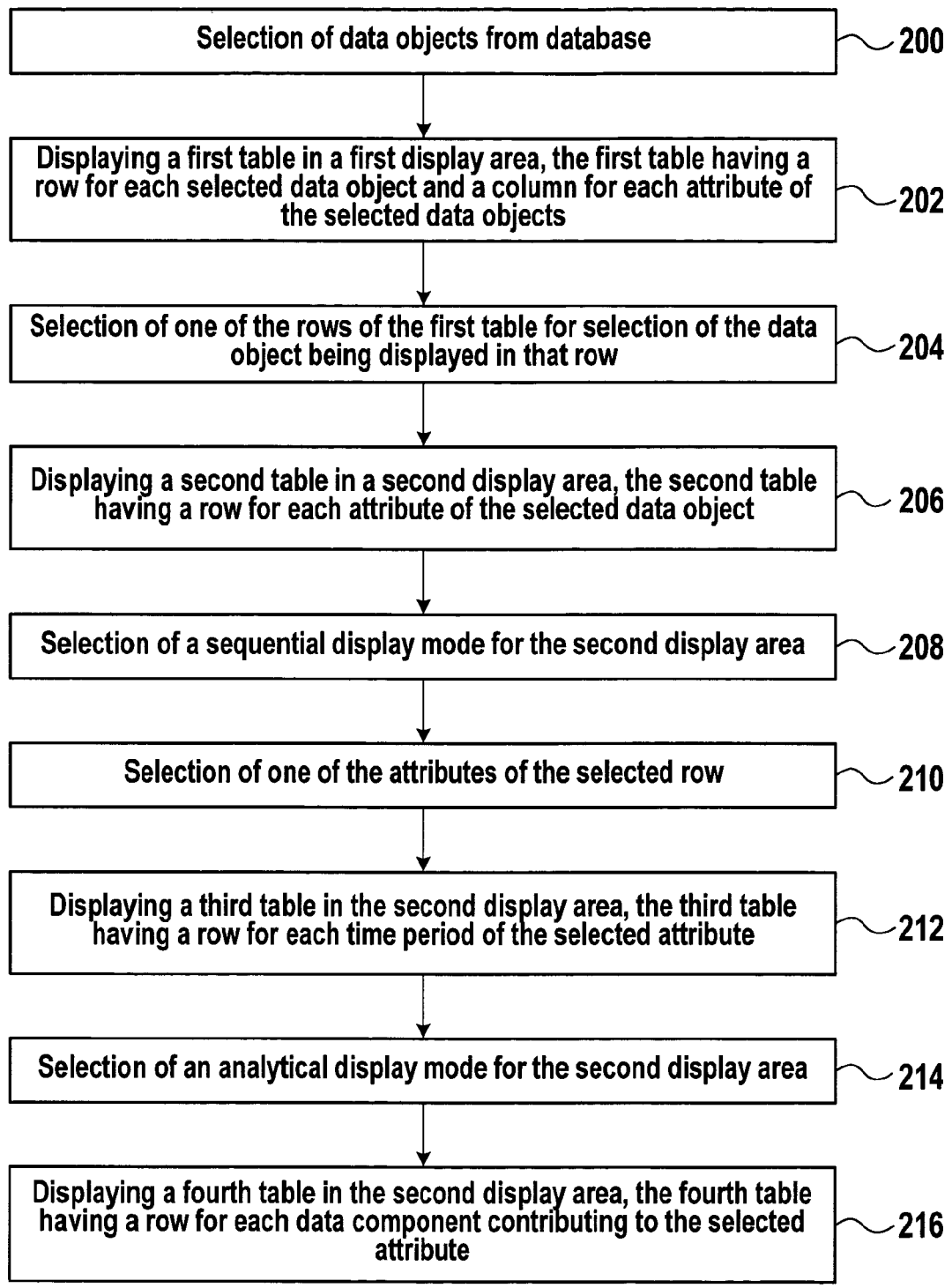
FIG. 2 is a flowchart of an exemplary method, consistent with an embodiment of the invention.
Figure 3:
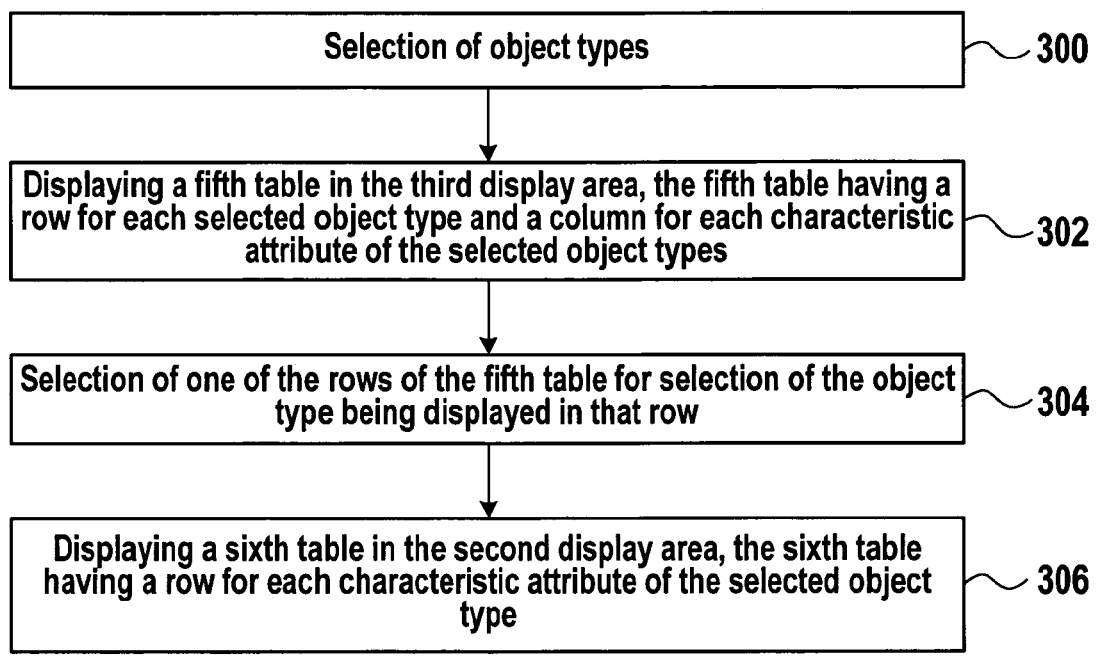
FIG. 3 is a flowchart of a further exemplary method, consistent with an embodiment of the invention.

In step 200 of FIG. 2, a plurality of data objects are selected from database 110. This can be done by means of a search query that is executed by processor 102 in order to filter out a set of data objects of interest.

In step 202, a first table is displayed in a first display area on computer monitor 120. The first table may have a row for each selected data object and a column for each attribute of the selected data objects. The first table may be too large to fit onto computer monitor 120. Therefore, the first table preferably includes a horizontal scroll bar in order to facilitate a user's access to various portions of the first table. However, accessing portions of the first table by means of the horizontal scroll bar is not intuitive, if the user desires a complete display of a selected object.

In step 204, the user selects one of the rows of the first table for selection of one of the data objects being assigned and displayed in that row. In response, a second table is generated and displayed in a second display area. The second table has a row for each attribute of the selected data object. Typically, the second table will completely fit on computer monitor 120, such that the user gets a display of the complete attributes of the selected data object.

In step 208, the user selects the sequential display mode. In the sequential display mode, the user can view the data values a selected attribute of the selected data object has had in various time periods. In step 210, the user selects one of the attributes of the selected row in the first table. In response, a third table is generated and displayed in the second display area (step 212). The third table has a row for each time period of the selected attribute.

In step 214, the user selects an analytical display mode. In the analytical display mode, the user can access the data components that contribute to the data value of the selected attribute. In response to the user's selection of the analytical display mode, a fourth table may be generated and displayed in the second display area, in step 216. The fourth table has a row for each of the data components that contribute to the data value of the selected attribute.

In addition, computer system 100 facilitates to view the object type definitions stored in configuration table 118. For this purpose, a set of the predefined object types is selected, in step 300 (see FIG. 3). This can be done by selecting the object type names defined in configuration table 118 from a pulldown menu.

In one embodiment, the selected object types are displayed in fifth table in a third display area. The fifth table has a row for each selected object type and a column for each characteristic attribute of the selected object types. It is to be noted that the fifth table does not contain columns for the key figure attributes of the selected object types as the key figure attributes have no assigned data value in the object type definition.

In step 304, the user can select one of the rows of the fifth table for selection of one of the object types being displayed in the fifth table shown in the third display area. In response to the user's selection of one of the rows of the fifth table, a sixth table is generated and displayed in the second display area, in step 306. The sixth table has a row for each characteristic attribute of the selected object type. This way the user gets a complete display of all characteristic attributes of the selected object type even if the fifth table is to last to fit into the third display area.

FIG. 4 shows an exemplary window 400 that may be generated by computer system 100 and displayed on computer monitor 120 (cf. FIG. 1). Window 400 has pane 402 and pane 404. First table 1 is shown in pane 402 and second table 2 is shown in pane 404. In the example considered here, the user has selected data objects D1 and D2 from database 110. Data object D1 is of object type I and data object D2 is of object type II. In accordance with the configuration table 118, object type I has attributes A*, B*, C*, D, E, F, whereas object type II has attributes A*, B*, G*, D, E, H, I.

Table 1 has a row for each of the selected data objects D1 and D2 and a column for each of the attributes of the selected data objects D1 and D2. The table fields show the respective data values of the attributes. For example, attribute A of data object D1 has data value 1, attribute B of data object D1 has data value 2, etc. In the example considered here, the user has selected the first row of table 1, i.e., the row that shows the data values of the attributes for data object D1. As a consequence, table 2 has been generated and is displayed in pane 404. Table 2 has a row for each one of the attributes of the object type I of the selected data object D1 and shows the respective data values.

By selecting the row that is assigned to data object D2, the user can change the view that is shown in pane 404. In response to the user's selection of data object D2 by clicking on the respective row in table 1, another table 2 is generated that has a row for each of the attributes of the object type of II of data object D2, as illustrated in FIG. 5.

This is particularly advantageous if there is a large number of attributes such that table 1 does not completely fit into pane 402. The user can select individual data objects shown in table 1 in order to get a complete view of the selected data object by means of table 2. This has the advantage that a user does not need to employ a horizontal scroll bar in order to view a complete data. Providing a separate display of a selected data object in table 2 has the advantage that a more intuitive display is provided. Another advantage is that this can be more ergonomic in comparison to a horizontal scroll operation for access to hidden portions of table 1.

FIG. 6 shows exemplary window 400 after the user has selected a sequential display mode. In the example considered here, the user has selected attribute F of data object D1 by clicking on the respective data field of table 1. In response, a third table 3 is generated that shows the actual and historic data values of attribute F of object D1. In the example considered here, data values for periods P.1, P.2, P.3 and P.4 are stored in database 110 for attribute F. Period P.1 is the current period showing the current data value of attribute F. Periods P.2, P.3, P.4 are past periods. Hence, the user is provided with an easy to use and intuitive feature for accessing the time sequence of data values of a selected attribute.

FIG. 7 shows exemplary window 400 after the user has selected an analytical display mode. In the analytical display mode, a fourth table 4 is generated and displayed in pane 404. Table 4 shows the data components that contribute to the current data value of a selected attribute.

In the example considered here, attribute F of data object D1 has been selected. Attribute F is a cost value having various cost components, i.e., cost of raw materials 'raw', labor costs 'labor' and miscellaneous other costs 'other'. In other words, the analytical display mode provides and easy to use and intuitive feature for a 'drill down' analysis of individual attribute data values.

FIG. 8 shows exemplary window 400 after the user has selected a larger number of data objects that are displayed in table 1 in pane 402. As in the example of FIG. 4, data object D1 has been selected such that table 2 showing the attributes of the selected data object D1 is shown in pane 404. In addition, window 400 has pane 406 for displaying a fifth table 5.

By means of the graphical user interface the user can select an object type, such as by means of a pull down menu. In response, a row is created in table 5 and columns showing the characteristic attributes of the selected object type. In the example considered here, the user has selected object type I such that table 5 has columns for the respective characteristic attributes A, B and C. By means of table 5, the user can view data values of characteristic attributes of data objects that have already been created such as, for example, data object D1 and he or she can also instantiate additional data objects of the selected object type I.

FIG. 9 shows exemplary window 400 after the user has deselected the row in table 1 and has selected one of the rows of table 5. In response, table 6 is generated and displayed in pane 404. Table 6 has a row for each characteristic attribute of the object type of an object that the user has selected from table 5 by clicking on the respective row.

Figure 10:
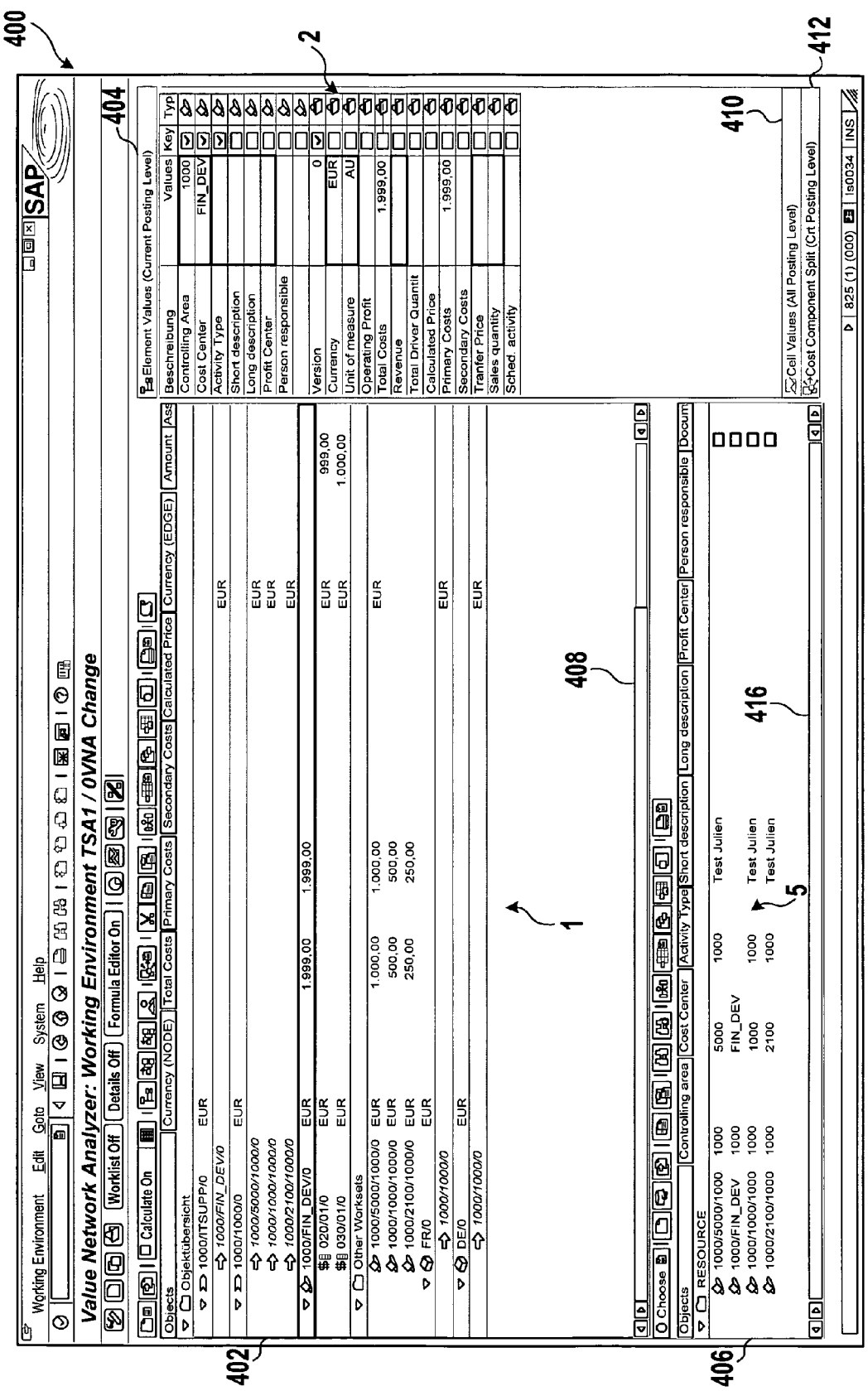
FIG. 10 is a screen shot of an implementation example.
Figure 11:
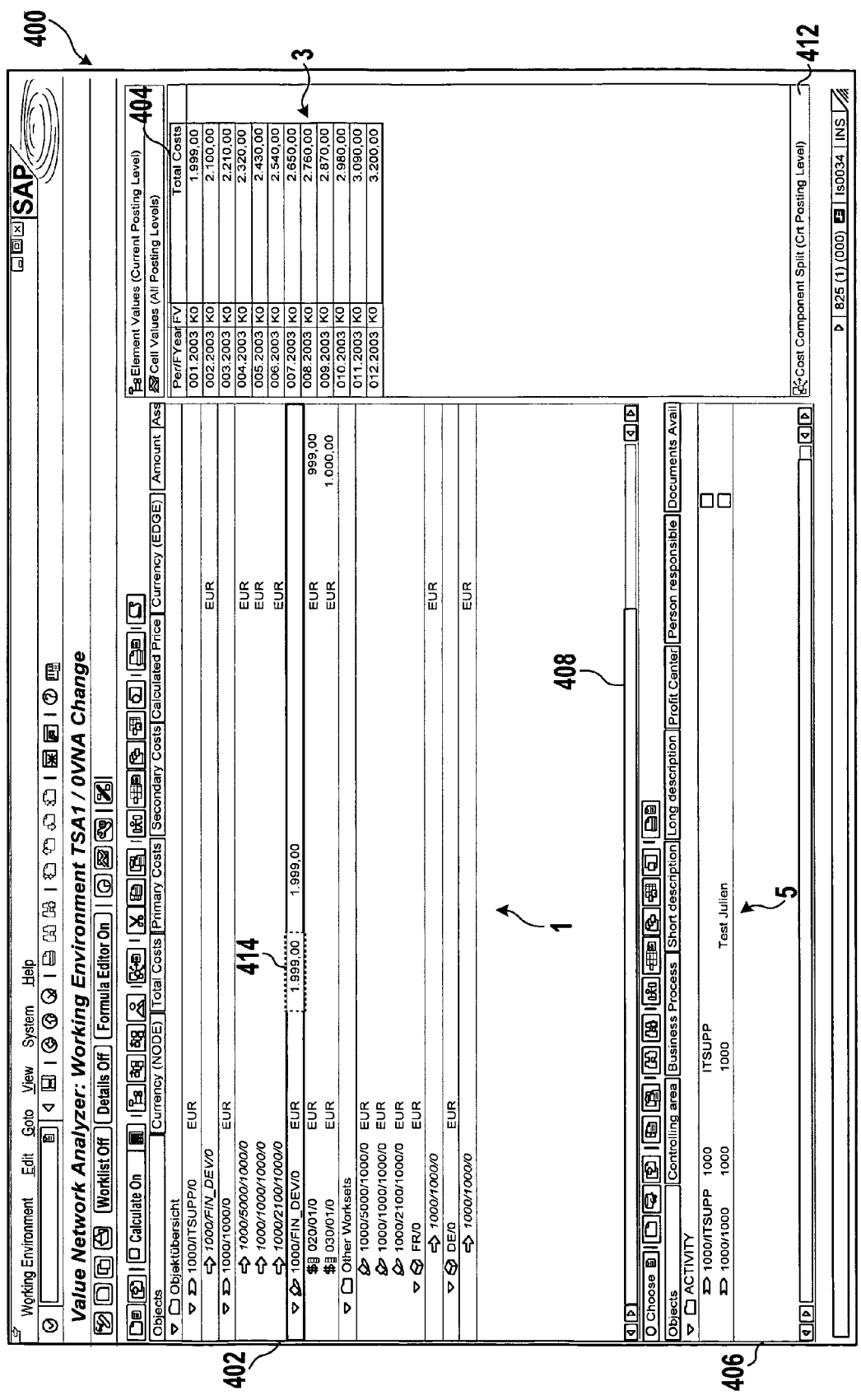
FIG. 11 is a screen shot of the implementation example of FIG. 10 in a sequential display mode.
Figure 12:
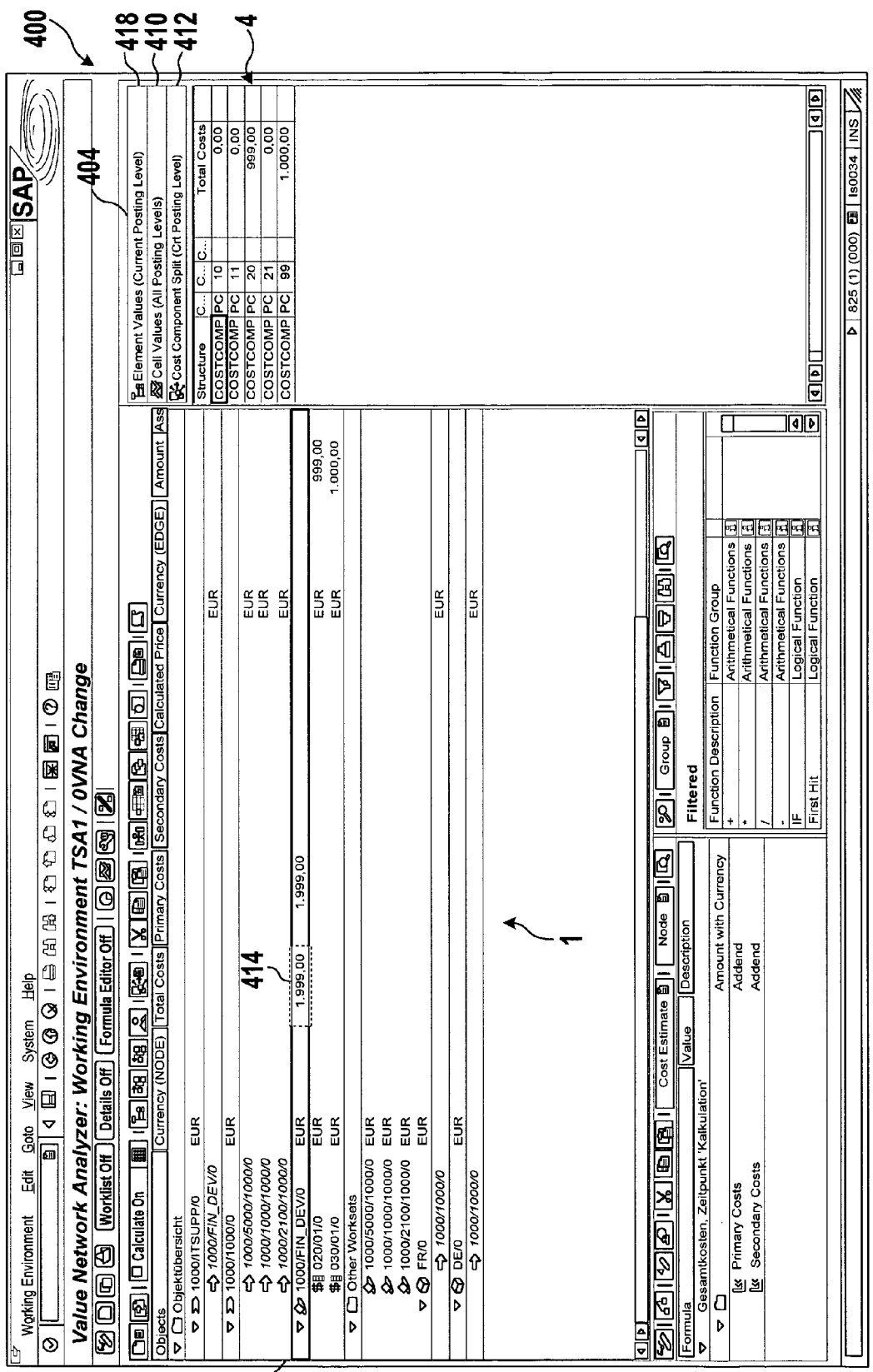
FIG. 12 is a screen shot of the implementation example of FIG. 10 in an analytical display mode.

FIGS. 10, 11 and 12 show screen shots of an implementation example. Like elements in FIGS. 10, 11 and 12 will be designated by the same reference numerals as in FIGS. 4, 2, 9.

Window 400 of FIG. 10 has a horizontal scroll bar 408, as table 1 is too large to fit into pane 402. Table 1 has columns 'currency (NODE)', 'total costs', 'primary cost', 'secondary costs', 'calculated prize', 'currency (EDGE)', 'amount', ... The user has selected data object 1000/FIN_DEV/0. As a consequence, table 2 within pane 404 shows a list of the attributes of the selected data object and their respective data values. In addition, table 2 indicates for each attribute whether it's a key attribute (cf. column 'key') and whether it's a characteristic attribute or a key figure attribute (cf. column 'type' in table 2).

Pane 406 shows the characteristic attributes of selected data objects having a selected data object type. It has horizontal scroll bar 416.

Pane 404 has virtual buttons 410 and 412. By clicking on button 410 the user can select the sequential display mode. The sequential display mode is shown in the screen shot of FIG. 11.

In the sequential display mode the user selects one of the attributes of the selected data object. In the example considered here this is attribute 'total costs' of data object 1000/ FIN_DEV/0. In response to the user's selection of the attribute, the attribute is highlighted by means of frame 414.

Selection of the attribute can be accomplished by clicking on the respective table field. In response table 3 is generated and displayed in pane 404. In the example considered here, table 3 has a row for each month of year 2003 and the respective cost value for a given month.

By clicking on button 412, the user can select the analytical display mode. In response table 4 is generated and displayed in pane 404. Table 4 shows the cost components that have contributed to the total costs as shown in frame 414. By clicking on button 418 the use can go back to the original view ("element values") of FIG. 10 or to the view of FIG. 11 by clicking on button 410.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

LIST OF REFERENCE NUMERALS

| | |
|---|---|
| 1 | table |
| 2 | table |
| 3 | table |
| 4 | table |
| 5 | table |
| 6 | table |
| 110 | database |
| 112 | database table |
| 114 | database table |
| 116 | database table |
| 118 | configuration table |
| 120 | computer monitor |
| 122 | computer mouse |
| 400 | window |
| 402 | pane |
| 404 | pane |
| 406 | pane |
| 408 | horizontal scroll bar |
| 410 | button |
| 412 | button |
| 414 | frame |
| 416 | scroll bar |
| 418 | button |

What is claimed is:

1. A method for displaying a plurality of data objects, each of the data objects having an object type of a predefined set of object types, each object type including a set of attributes, wherein the set of attributes for each object type includes first attributes designated as attributes that change less frequently over time and second attributes designated as attributes that change more frequently over time than the first attributes, the method comprising:

displaying a first table including a row for each data object of the plurality of data objects and a column for each attribute of the set of attributes;

receiving a selection of an object type;

in response to the selection of the object type, displaying a second table including a row for each data object of the plurality of data objects having the selected object type and a column for each of the first attributes, but no rows for data objects of the plurality of data objects that do not have the selected object type and no columns for any of the second attributes;

receiving a selection of one of the data objects in the first table or the second table; and displaying a third table including a row for each attribute included in the row of the selected data object and a column that includes attribute values, wherein the first, second, and third tables are displayed in respective first, second, and third display areas.

2. The method of claim 1, wherein the first, second, and third display areas are implemented as respective first, second, and third panes.

3. The method of claim 1, wherein the first, second, and third display areas are implemented as respective first, second, and third windows.

4. The method of claim 1, further comprising:

receiving a selection of a sequential display mode for the third display area;

receiving a selection of one of the attributes displayed in a data field in the first table; and displaying a fourth table in the third display area, the fourth table including a row for each of a plurality of time periods of the selected attribute.

5. The method of claim 1, further comprising:

receiving a selection of an analytical display mode for the third display area;

receiving a selection of one of the attributes displayed in a data field in the first table; and displaying a fourth table including a row for each of a plurality of data components contributing to the selected attribute.

6. The method of claim 1, wherein receiving the selection of one of the data objects in the first table or the second table includes receiving a selection of one of the rows in the first table or the second table.

7. The method of claim 1, further comprising:

receiving a selection of the object type by receiving a selection from an object type selection menu.

8. The method of claim 1, wherein the first attributes are characteristic attributes and the second attributes are key figures.

9. A computer program product stored on a computer readable storage medium, the computer program product for displaying a plurality of data objects, each of the data objects having an object type of a pre-defined set of object types, each object type including a set of attributes, wherein the set of attributes for each object type includes first attributes designated as attributes that change less frequently over time and second attributes designated as attributes that change more frequently over time than the first attributes, the computer program product comprising computer executable instructions for:

displaying a first table including a row for each data object of the plurality of data objects and a column for each attribute of the set of attributes;

enabling a user to select an object type;

displaying a second table including a row for each data object of the plurality of data objects having the selected object type and a column for each of the first attributes, but no rows for data objects of the plurality of data objects that do not have the selected object type and no columns for any of the second attributes;

enabling a user to select one of the data objects in either the first table or the second table; and displaying a third table including a row for each attribute included in the row of the selected data object and a column that includes attribute values, whereby the first, second, and third tables are displayed in respective first, second, and third display areas.

10. The computer program product of claim 9, further comprising computer executable instructions for providing a sequential display mode.

11. The computer program product of claim 9, further comprising computer executable instructions for providing an analytical display mode.

12. The computer program product of claim 9, further comprising computer executable instructions for:

enabling a user to select a sequential display mode for the third display area;

enabling a user to select one of the attributes displayed in a data field in the first table; and displaying a fourth table in the second display area, the fourth table including a row for each of a plurality of time periods of the selected attribute.

13. The computer program product of claim 9, further comprising computer executable instructions for:

enabling a user to select an analytical display mode for the third display area;

enabling a user to select one of the attributes displayed in a data field in the first table; and displaying a fourth table including a row for each data component contributing to the selected attribute.

14. The computer program product of claim 9, further comprising computer executable instructions for:

enabling the user to select one of the data objects in either the first table or the second table by enabling the user to graphically select one of the rows in the first table or the second table.

15. The computer program product of claim 9, further comprising computer executable instructions for:

enabling the user to select one of the object types by using an object type selection menu.

16. A data processing system comprising storage means for storage of data values of a plurality of data objects, each of the data objects having an object type of a predefined set of object types, each object type including a set of attributes, wherein the set of attributes for each object type includes first attributes designated as attributes that change less frequently over time and second attributes designated as attributes that change more frequently over time than the first attributes, the data processing system further comprising processor means programmed for:

displaying a first table including a row for each data object of the plurality of data objects and a column for each attribute of the set of attributes;

receiving a selection of an object type;

in response to the selection of the object type, displaying a second table including a row for each data object of the plurality of data objects having the selected object type and a column for each of the first attributes, but no rows for data objects that do not have the selected object type and no columns for any of the second attributes;

enabling a user to select one of the data objects in the first table or the second table; and displaying a third table including a row for each attribute included in the row of the selected data object and a column that includes attribute values, wherein the first, second, and third tables are displayed in respective first, second, and third display areas.

17. The data processing system of claim 16, further comprising a graphical user interface to enable the user's selection of one of the data objects by enabling the user to select one of the rows in the first table or the second table via the graphical user interface.

18. The data processing system of claim 16, the processor means being additionally programmed for:

enabling a user to select a sequential display mode for the third display area;

enabling a user to select one of the attributes displayed in a data field in the first table; and displaying a fourth table in the third display area, the fourth table including a row for each of a plurality of time periods of the selected attribute.

19. The data processing system of claim 16, the processor means being additionally programmed for:

enabling a user to select an analytical display mode for the third display area;

enabling a user to select one of the attributes displayed in a data field in the first table; and displaying a fourth table including a row for each data component contributing to the selected attribute.

* * * * *

UNITED STATES PATENT AND TRADEMARK OFFICE
CERTIFICATE OF CORRECTION

PATENT NO. : 7,587,666 B2
APPLICATION NO. : 11/080816
DATED : September 8, 2009
INVENTOR(S) : Delvat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this

Twenty-first Day of September, 2010

David J. Kappos
*Director of the United States Patent and Trademark Office*